United States Patent [19]

Ishiga et al.

[11] Patent Number: 5,298,563
[45] Date of Patent: Mar. 29, 1994

[54] PROCESS FOR PREPARING AN IMPACT RESISTANT RESIN

[75] Inventors: Narito Ishiga, Yokkaichi; Yoshihiko Takeda, Mie, both of Japan

[73] Assignee: Mitsubishi Monsanto Chemical Company, Tokyo, Japan

[21] Appl. No.: 72,216

[22] Filed: Jun. 7, 1993

Related U.S. Application Data

[63] Continuation of Ser. No. 434,184, Nov. 13, 1989, abandoned.

[51] Int. Cl.$^5$ .............................. C08F 4/40; C08F 279/02
[52] U.S. Cl. ................................. 525/245; 525/265; 525/292; 525/310; 525/315; 525/316; 526/172; 528/489; 528/490
[58] Field of Search ............... 525/245, 265, 292, 310, 525/315, 316; 526/172; 528/489, 490

[56] References Cited

U.S. PATENT DOCUMENTS

| | | | |
|---|---|---|---|
| 3,761,455 | 9/1973 | Tanaka et al. | 528/489 |
| 3,980,600 | 9/1976 | Coffey | 528/489 |
| 4,205,020 | 5/1980 | Hendy | 525/66 |
| 4,220,734 | 9/1980 | Kosugi | 525/85 |
| 4,334,039 | 6/1982 | Dupre | 525/260 |
| 4,336,355 | 6/1982 | Wu | 525/265 |
| 4,345,067 | 8/1982 | Wunder | 528/489 |
| 4,886,857 | 12/1989 | Ota | 525/84 |
| 4,897,462 | 1/1990 | Yusa et al. | 528/490 |
| 5,225,494 | 7/1993 | Ishiga | 525/316 |

*Primary Examiner*—Vasu S. Jagannathan
*Attorney, Agent, or Firm*—Oblon, Spivak, McClelland, Maier & Neustadt

[57] ABSTRACT

A process for preparing an impact resistant resin, which comprises a step of graft copolymerizing a monomer mixture comprising an aromatic vinyl monomer and a monomer copolymerizable therewith, to a butadiene rubber-like polymeric latex in the presence of a redox polymerization initiator; a step of coagulating the resulting graft copolymer latex by mixing an antioxidant thereto and adding an alkaline earth metal salt thereto; and a step of washing the coagulated product by a washing water having the pH adjusted to a level of at most 7.

9 Claims, No Drawings

PROCESS FOR PREPARING AN IMPACT RESISTANT RESIN

This application is a continuation of application Ser. No. 07/434,184, filed on Nov. 13, 1989, now abandoned.

The present invention relates to a process for preparing an impact resistant resin. More particularly, it relates to a process for producing a powder of an impact resistant resin typically an ABS resin which is excellent in the heat stability during the drying operation and undergoes little heat discoloration during the molding and which is capable of presenting a molded product having high impact strength, from an ABS resin latex obtained by emulsion polymerization.

For the production of an ABS resin known as an impact resistant resin by an emulsion polymerization method, a styrene monomer and an acrylonitrile monomer copolymerizable therewith, are copolymerized to a butadiene rubber-like polymeric latex in the presence of a polymerization initiator, and the resulting copolymer latex is coagulated by adding an antioxidant and then a coagulating agent thereto. The obtained coagulated product is separated and subjected to steps of washing with water, dehydration and drying to obtain the resin in a powder form (hereinafter referred to as ABS resin crumbs).

In the above process, it is important to obtain ABS resin crumbs excellent in the heat stability for the drying step. Namely, if the heat stability of crumbs is poor, a danger of catching a fire during this step increases.

In general, it is considered that the heat stability of ABS resin crumbs is influenced by the rubber-like polymer contained therein, the type and the amount of the polymerization initiator used, the type of the coagulating agent, the type and amount of the antioxidant, etc.

To improve the heat stability of ABS resin crumbs for the drying step, a method of reducing the content of the rubber-like polymer as far as possible, is conceivable. However, the content of the rubber-like polymer is preferably at a rather high level of from 30 to 60% by weight in view of the balance of the physical properties of the resulting ABS resin crumbs and the productivity. Therefore, it is problematic to reduce the content too much.

With respect to the polymerization initiator, there are a redox type and a persulfate type. According to the experiments conducted by the present inventors, the redox type is preferred to the sulfate type from such a viewpoint that the impact strength of a molded product of the resulting ABS resin is high and the heat discoloration during the molding is little. On the other hand, the redox polymerization initiator is inferior to the persulfate type from the viewpoint of the thermal stability of ABS resin crumbs during the drying step.

With respect to the coagulating agent, an alkaline earth metal salt and an acid may be mentioned. According to the experiments conducted by the present inventors, it has been found that the acid is preferred from the viewpoint of the heat stability, but on the other hand, when the acid is used, the impact strength of a molded product of the resulting ABS resin is poor, and excellent physical properties can not be obtained.

With respect to the antioxidant, it is preferred to increase the amount of its incorporation for the purpose of improving the heat stability. However, such tends to lead to high costs and is economically disadvantageous.

It is an object of the present invention to solve the above-mentioned various problems involved in the production of an impact resistant resin typically an ABS resin by emulsion polymerization and to provide a process for preparing an impact resistant resin which is excellent in the heat stability during the drying step of the coagulated product and undergoes little heat discoloration during the molding and which has excellent impact strength.

The present invention provides a process for preparing an impact resistant resin, which comprises:

a step of graft copolymerizing a monomer mixture comprising an aromatic vinyl monomer and a monomer copolymerizable therewith, to a butadiene rubber-like polymeric latex in the presence of a redox polymerization initiator;

a step of coagulating the resulting graft copolymer latex by mixing an antioxidant thereto and adding an alkaline earth metal salt thereto; and a step of washing the coagulated product by a washing water having the pH adjusted to a level of at most 7.

This process preferably includes an additional step of further washing the washed coagulated product with a washing water having the pH adjusted to a level of at least 7.5.

Now, the present invention will be described in further detail.

According to the process of the present invention, firstly, a monomer mixture comprising an aromatic vinyl monomer and a monomer copolymerizable therewith, is graft-copolymerized to a butadiene rubber-like polymeric latex in the presence of a redox polymerization initiator to obtain a graft polymer latex.

The butadiene rubber-like polymeric latex to be used in the process of the present invention, may, for example, be a polybutadiene latex or a copolymer of butadiene with other copolymerizable monomer, which contains at least 50% by weight of butadiene. The monomer copolymerizable with butadiene may be an aromatic vinyl monomer such as styrene, u-methylstyrene, p-methylstyrene, chlorostyrene or vinyl toluene, a vinyl cyanide compound such as acrylonitrile or methacrylonitrile, or an alkyl ester of acrylic acid or methacrylic acid. As an emulsifier to be used for the preparation of the above butadiene rubber-like polymeric latex, an alkali metal salt of a fatty acid or a metal salt of disproportionated rosin acid may be mentioned. These emulsifiers may be used alone or in combination. The fatty acid may be, for example, capric acid, lauric acid, myristic acid, palmitic acid, stearic acid, oleic acid, linolic acid or linolenic acid. The alkali metal may be potassium, sodium or 1:thium. The polymerization initiator to be used for the preparation of the rubber-like polymeric latex, may be a persulfate such as potassium persulfate or ammonium persulfate, an organic peroxide, or a redox initiator such as an iron salt. If necessary, a polymerization controlling agent such as a mercaptan, a terpene or a halide, and an electrolyte such as sodium pyrophosphate or potassium chloride, may be used as polymerization assisting agents for the preparation of the rubber-like polymeric latex.

The above butadiene rubber-like polymeric latex may be used by itself for the graft copolymerization with the aromatic vinyl monomer and the monomer copolymerizable therewith. However, in a case where the average particle size of the rubber containing in this latex is less than 0.15 μm, it is preferred to add an acid or an acid anhydride such as sulfuric acid, hydrochloric acid, acetic acid or acetic anhydride to increase the average particle size of rubber to a level of at least 0.15 μm before subjecting it to the graft copolymerization, so that the impact strength of ABS resin crumbs can be improved. To increase the average particle size of rubber, it is possible to employ a method wherein rubber-like polymeric latexes having different average particle sizes are subjected separately to the growth of the particle sizes, and the grown latexes are mixed and used for the graft copolymerization.

After increasing the average particle size of rubber by adding an acid or an acid anhydride as described above, it is preferred to add a basic substance such as sodium hydroxide or potassium hydroxide and/or a surfactant of a sulfonic acid type to the latex to maintain the storage stability of the latex and the stability of a graft polymer latex formed by the graft polymerization.

In the process of the present invention, to the above rubber-like polymeric latex, an aromatic vinyl monomer and a monomer copolymerizable therewith, are graft polymerized. The vinyl aromatic monomer may be, for example, styrene, α-methylstyrene, p-methylstyrene, chlorostyrene or vinyl toluene. The monomer copolymerizable therewith may be, for example, a vinyl cyanide compound such as acrylonitrile or methacrylonitrile, acrylic or methacrylic acid, or an ester such as a methyl, ethyl, propyl, n-butyl or i-butyl ester, of acrylic or methacrylic acid. Such monomers may be used alone or in combination as a mixture of two or more. Further, a bifunctional monomer such as divinylbenzene or ethylene glycol dimethacrylate, may be mixed in a small amount.

The ratio of the above rubber-like polymeric latex to the monomers to be graft polymerized thereto, is preferably selected so that the ratio of the rubber-like polymer in the resulting ABS resin crumbs will be within a range of from 30 to 60% by weight. If the ratio exceeds this range, the outer appearance and the impact strength tend to be poor. On the other hand, if the ratio is less than 30% by weight, the productivity will be low, such being economically disadvantageous.

As the polymerization initiator to be used for the graft copolymerization, a redox type initiator composed of a combination of an organic peroxide and an iron salt, may be mentioned. The organic peroxide may be, for example, cumene hydroperoxide, t-butyl hydroperoxide, diisopropylbenzene hydroperoxide or p-methane hydroperoxide. The iron salt may be ferrous sulfate. Such an initiator may be used in combination with an assisting reducing agent such as saccharide or sodium-formaldehyde sulfoxylate, or with a chelating agent such as ethylenediaminetetraacetic acid (EDTA). If a persulfate is used as a polymerization initiator, the resulting ABS resin crumbs tend to undergo heat discoloration during the molding, and the impact strength tends to be low. Therefore, use of a persulfate should be avoided.

As the emulsifier to be used for the graft copolymerization, those mentioned above as the emulsifier to be used for the preparation of the butadiene rubber-like polymeric latex, may be mentioned.

If necessary, a polymerization controlling agent or an electrolyte as mentioned above, may also be employed.

The monomers, the emulsifier, the polymerization initiator, the polymerization controlling agent, etc. to be added to the butadiene rubber-like polymeric latex for the graft copolymerization, may be added by any one of a method of adding all at once, a method of portionwise addition or a method of continuous addition.

According to the method of the present invention, to the graft copolymer latex formed by the above graft copolymerization reaction, an emulsion of an antioxidant is mixed, and an aqueous solution of an alkaline earth metal salt is added to coagulate this latex. The antioxidant used here may be, for example, a phenol type antioxidant, a phosphite type antioxidant, a thioester type antioxidant or a mixture thereof. As an assisting agent useful for preparing an emulsion of such an antioxidant, an alkali metal salt of a fatty acid or a sulfonic acid type or nonionic surfactant may be mentioned, Otherwise, an alkali such as sodium hydroxide or potassium hydroxide may be added at the time of preparing the emulsion. As the coagulating agent, magnesium sulfate or calcium chloride may be used.

If an acid is used for coagulation, not only the impact strength of a molded product obtainable from the graft copolymer powder (ABS resin crumbs) will be low, but also yellowing during the molding and corrosion of the molding machine tend to result, which are believed to be caused by the acid remaining in a small amount or by the formation of a fatty acid. Therefore, it is undesirable to use an acid for coagulation.

The coagulated product of the graft copolymer formed in the above coagulation step is separated by filtration. According to the process of the present invention, it is essential to wash this separated coagulated product of the graft copolymer with a washing water having the pH (hydrogen index) adjusted to at most 7. By the washing with such an acidic washing water with a pH of at most 7, various assisting agents (such as the polymerization initiator, the emulsifier, the coagulating agent and reaction products thereof) remaining in the coagulated product of the graft copolymer or on the surface thereof, are believed to be washed away or changed to be stable against heat.

As the pH controlling agent to obtain the washing water having the pH adjusted to at most 7, known acids such as hydrochloric acid, sulfuric acid, phosphoric acid, acetic acid, boric acid, nitric acid and sodium hydrogen sulfate, may be employed. In the case of washing under an acidic condition, the pH of the washing water is adjusted to a level of not higher than 7. Particularly preferably, the pH is adjusted within a range of from 3.0 to 6.5. If the pH is outside this range, the graft copolymer may undergo a property change, or it becomes difficult to obtain the washing effects.

In the process of the present invention, the coagulated product of the graft copolymer thus washed, is preferably washed again with a basic washing water having the pH adjusted to a level of at least 7.5. By the rewashing with such a basic washing water, various agents including acids used for washing, remaining in the coagulated product of the graft copolymer or on the surface thereof, are believed to be washed away under the basic condition or changed to be stable against heat, for example, by neutralization, whereby a better result can be attained.

As the pH controlling agent to obtain the washing water having the pH adjusted to a level of at least 7.5, known bases such as potassium hydroxide, sodium hydroxide, lithium hydroxide, ammonia (aqueous), ammonium carbonate, potassium carbonate, sodium carbonate and sodium hydrogen carbonate, may be employed.

In the case of rewashing the coagulated product of the graft copolymer, the pH of the washing water is adjusted to a level of at least 7.5. Particularly preferably, it is adjusted within a range of from 7.5 to 9.5. If the pH is outside this range, the graft copolymer is likely to undergo a property change, or it becomes difficult to attain the washing effects.

The water-containing coagulated product of the graft copolymer after the washing step or after the rewashing step, is dehydrated by means of a conventional dehydrating means such as a centrifugal dehydrater and then dried under heating by a conventional drying means such as a fluidized drier or a rotary drier.

As described in the foregoing, the present invention provides the following remarkable effects, and its value for industrial application is significant.

1) In the process of the present invention, a redox polymerization initiator is used for the preparation of the graft copolymer, whereby the thermal stability of the ABS resin crumbs during the molding is substantially improved as compared with the case where a conventional persulfate is employed.

2) According to the process of the present invention, in the washing step of the coagulated product after the coagulation step, the coagulated product is washed with a washing water having the pH value adjusted to at most 7 for the preparation of the ABS resin crumbs, whereby the thermal stability of the crumbs at the time of drying water-containing ABS resin crumbs, is improved.

3) In a preferred embodiment of the process of the present invention, the thermal stability of the ABS resin crumbs during the molding is substantially improved by adopting a step of coagulating the graft copolymer latex and a step of washing the coagulated product twice by an acid and a base.

4) According to the preferred embodiment of the process of the present invention, in the step of washing the coagulated product after the coagulation step for the preparation of the ABS resin crumbs, the coagulated product is washed with a washing water having the pH adjusted to a level of at most 7, and then rewashed by a washing water having the pH adjusted to a level of at least 7.5, whereby the thermal stability of the crumbs at the time of drying the water-containing ABS resin crumbs will be improved, and the residual amount of organic acids, etc. which deteriorate the physical properties of the graft copolymer can be reduced.

5) When molded, the ABS resin crumbs obtained by the process of the present invention, provide molded products excellent in the impact strength, the outer appearance and the heat stability during the molding.

Now, the present invention will be described in further detail with reference to Examples. However, it should be understood that the present invention is by no means restricted to such specific Examples.

In the following Examples, various physical properties were evaluated by the following methods.

Heat Stability During the Drying Operation of Crumbs 2 g of dried crumbs were put in an aluminum dish and placed in a gear oven maintained at a temperature of 170° C., whereupon the time (minutes) until discoloration was measured. The longer the time, the better the heat stability.

Amount of Residual Organic Acid

Dried crumbs were dissolved in 1,4-dioxane and esterified by means of diazomethane. Then, the weight percent of an organic acid contained in the dried crumbs was analyzed by gas chromatography.

Mold Deposit

A styrene-acrylonitrile copolymer (AS resin) (SAN-C, tradename, manufactured by Mitsubishi Monsanto Chemical Company) was blended to dry crumbs, and the mixture was kneaded to prepare a composition having the rubber content of 14% by weight based on the total composition. The composition was pelletized and test pieces were continuously molded by injection molding.

If no deposition causing a fogging or the like on the inner surface of the mold was visually observed even when the continuous molding operation exceeded 100 times, such a condition was evaluated to be $\bigcirc$. When such a deposit was observed during the continuous molding operation of from 50 to 100 times, such a condition was evaluated to be $\Delta$. When the deposit was observed within the continuous operation of less than 50 times, such a condition was evaluated to be X.

Tensile Strength

By using the pellets prepared in the above test for mold deposit, test pieces were prepared by injection molding. With respect to the test pieces thus prepared, the tensile strength was measured in accordance with JIS K-6871.

Izod Impact Strength

With respect to the above test pieces, the Izod impact strength was measured in accordance with JIS K-6871.

Gloss

By using the above pellets, a flat plate of 100 mm × 50 mm × 3.5 mm was molded by injection molding at a cylinder temperature of 220° C. and a mold temperature of 45° C. With respect to this flat plate, the gloss was measured by means of a gloss meter prepared by Nippon Denshoku K.K. at an incident angle of 20° and at a reflection angle of 20°. The larger the numerical value, the better the gloss.

Heat Discoloration During the Molding

The color difference $\Delta E$ was measured by a color difference meter (SM color computer manufactured by Suga Shikenki K.K.) with respect to test pieces obtained by injection molding under usual cycles at a cylinder temperature of 220° C. by using the same pellets as the pellets prepared at the time of the above-mentioned tensile strength test and with respect to test pieces obtained by subjecting the pellets to heat retention at a cylinder temperature of 250° C. for 10 minutes, followed by injection molding under usual cycles. The larger the numerical value, the inferior the heat stability.

EXAMPLE 1

Preparation of Butadiene Rubber-like Polymeric Latex

Into a reactor equipped with a stirring means, a heating and cooling means and a pipe for supplying starting materials and having an internal capacity of 300 l, 125.4 kg of deionized water, 3.4 kg of sodium salt of a higher fatty acid, 680 g of sodium pyrophosphate, 255 g of 25% sodium hydroxide, 1.7 kg of styrene, 51 g of t-dodecylmercaptan, 15.3 kg of butadiene and 127.5 g of potassium persulfate were charged, and polymerization was initiated at a temperature of 67° C. During the continuous polymerization reaction at this temperature, 6.8 kg of styrene, 204 g of t-dodecylmercaptan and 61.2 kg of butadiene were continuously added to the reactor during a period of from 1 hour after the initiation to 5 hours from the initiation. The polymerization reaction was continued for 6 hours. Then, the internal temperature was raised from 67° C. to 80° C. over a period of 1 hour and a half, and the reaction was further continued for 2 hours and 30 minutes. Immediately thereafter, the internal temperature was cooled to room temperature to obtain a butadiene-styrene rubber copolymer latex. The solid content in the latex was 40.7% by weight. The average particle size of rubber contained in the latex was 0.07 μm (as measured by a nanosizer manufactured by Coulter Electronics Company, USA).

The butadiene-styrene copolymer latex thus obtained will be referred to as latex A-1.

Into a reactor equipped with a stirring means, a heating and cooling means and a pipe for supplying starting materials and having an internal capacity of 40 l, 114.7 kg of the above latex A and 2.4 kg of deionized water were charged, and at a temperature of 40° C., 87 g of acetic anhydride and 1.9 kg of deionized water were added and mixed. The mixture was stirred for about 1 minute and then left to stand for 10 minutes. Then, 63 g of sodium salt of a condensation product of β-naphthalene sulfonic acid with formaldehyde, 110 g of 48% potassium hydroxide and 880 g of deionized water were added and stirred to obtain a butadiene-styrene rubber copolymer latex containing rubber particles having the particle sizes increased. The pH of this latex was 7.4, the solid content was 29.5% by weight, and the average particle size of rubber was 0.35 μm (as measured by the same measuring method as above).

The butadiene-styrene rubber copolymer latex having the particle size enlarged, thus obtained, will be referred to as latex B-1.

Preparation of Graft Copolymer Latex

Into a reactor equipped with a stirring means, a heating and cooling means and a pipe for supplying starting materials and having an internal capacity of 40 l, 16.8 kg of the above latex B-1, 0.48 g of ferrous sulfate, 38.4 g of glucose and 1.2 kg of deionized water were charged. The internal temperature of this reactor was raised to 70° C. While maintaining this temperature, 24 g of cumene hydroperoxide, 110 g of rosin soap, 194 g of 10% potassium hydroxide and 1.6 kg of deionized water were continuously added over a period of 3 hours and 30 minutes from the initiation of the polymerization, and the graft copolymerization reaction was continued. Further, 3.36 kg of styrene, 1.44 kg of acrylonitrile and 48 g of t-dodecylmercaptane were continuously added to the reactor over a period of 3 hours after expiration of 15 minutes from the initiation of the polymerization. Then, the graft polymerization reaction was completed in 4 hours and 30 minutes from the initiation of the polymerization. The pH of the graft copolymer latex thus obtained was 9.1, and the solid content was 37.0% by weight. This graft copolymer latex will be referred to as latex C 1.

Preparation of ABS Resin Crumbs

Into a coagulation tank equipped with a stirring means, a heating and cooling means and a pipe for supplying starting materials and having an internal capacity of 100 l, 60 kg of deionized water and 1.2 kg of magnesium sulfate were introduced, and while heating and stirring at a temperature of at least 90° C., 20 g of the above latex C-1 was charged. To this latex C-1, an emulsion of an antioxidant comprising 55.6 g of triethylene glycol bis-3-(3-t-butyl-4-hydroxy-5-methylphenyl)propionate, 10.8 g of sodium lauryl sulfate and 840 g of deionized water, was preliminarily mixed. In the coagulation tank, the graft copolymer was coagulated as latex C-1 was charged.

Then, the slurry containing the coagulated product of the above graft copolymer was dehydrated by a centrifugal separator, and then washed under the condition of pH 6.1 by means of an acidic solution containing 16 g of sulfuric acid in 60 kg of deionized water. After removing the washing solution, second washing was conducted by using 60 kg of deionized water again. The pH of the washing solution this time was 6.6. After removing the washing solution, water was removed by centrifugal separator, and the product was dried at a temperature of 75° C. for 48 hours by a drier to obtain dried ABS resin crumbs.

With respect to the dry ABS resin crumbs thus obtained, tests for the heat stability during the drying of the crumbs, the tensile strength, the Izod impact strength, the gloss and the heat discoloration during the molding, were conducted. The results are shown in Table 1.

EXAMPLE 2

Latex C-1 obtained in Example 1 was subjected to coagulation treatment in the same manner as in Example 1 to obtain a slurry containing the coagulated product of the graft copolymer. The slurry was dehydrated by a centrifugal separator and then washed under a condition of pH 4.5 by means of an acidic solution containing 26 g of sulfuric acid in 60 kg of deionized water. After removing the washing solution, second washing was conducted by using 60 kg of deionized water again. The pH of the washing solution this time was 6.2. After removing the washing solution, treatment was conducted in the same manner as in Example 1 to obtain dried ABS resin crumbs.

With respect to the dried ABS resin crumbs thus obtained, various evaluation-tests were conducted in the same manner as in Example 1. The results are shown in Table 1.

COMPARATIVE EXAMPLE 1

Latex C-1 obtained in Example 1 was subjected to coagulation treatment in the same manner as in Example 1 to obtain a slurry containing the coagulated product of the graft copolymer. The slurry was dehydrated by a centrifugal separator and then washed under a condition of pH 7.9 by using 60 kg of deionized water. After removing the washing solution, second washing was conducted by using 60 kg of deionized water again. The pH of the washing solution this time was 8.2. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 1.

COMPARATIVE EXAMPLE 2

By using latex C-1 obtained in Example 1, treatment was conducted in the same manner as in Example 1 except that 222 g of sulfuric acid was used instead of 1.2 kg of magnesium sulfate used as the coagulating agent in Example 1, whereby a slurry containing ABS resin crumbs was obtained. This slurry was subjected to washing treatment and drying treatment in the same manner as in Example 1 to obtain dried ABS resin crumbs.

With respect to the dried ABS resin crumbs thus obtained, various evaluation tests were conducted in the same manner as in Example 1. The results are shown in Table 1.

EXAMPLE 3

Preparation of Butadiene Rubber-Like Polymeric Latex

Into a reactor equipped with a stirring means, a heating and cooling means and a pipe for supplying starting materials and having an internal capacity of 40 l, 14.7 kg of latex A-1 obtained in Example 1 and 2.5 kg of deionized water were charged, and at a temperature of 40° C., 72 g of acetic anhydride and 1.4 kg of deionized water were added and mixed. After stirring for about 1 minute, the mixture was left to stand for 10 minutes. Then, 30 g of sodium salt of a condensation product of β-naphthalene sulfonic acid with formaldehyde, 110 g of 48% potassium hydroxide and 880 g of deionized water were added and stirred to obtain a butadiene-styrene rubber copolymer latex containing rubber particles having the particle sizes increased. The pH of this latex was 7.5, the solid content was 29.1% by weight, and the average particle size of rubber was 0.25 μm (as measured by the measuring method as mentioned above). The latex thus obtained will be referred to as latex B-2.

On the other hand, in the same reactor as used for the preparation of the above latex B-2, 14.7 kg of latex A-1 obtained in Example 1 and 3.21 kg of deionized water were charged, and at the temperature of 25° C., 126 g of acetic anhydride and 3.1 kg of deionized water were added and mixed. After stirring for 1 minute, the mixture was left to stand for 30 minutes. Then, 90 g of sodium salt of a condensation product of β-naphthalene sulfonic acid with formaldehyde, 180 g of 48% potassium hydroxide and 1.59 kg of deionized water were added, and the mixture was stirred and mixed to obtain a butadiene-styrene rubber copolymer latex containing rubber particles having the particle diameters enlarged. The pH of this latex was 7.2, the solid content was 27.3% by weight, the average particle size of rubber was 0.65 μm. The latex obtained here will be referred to as latex B-3.

Preparation of Graft Copolymer Latex

Into a reactor equipped with a stirring means, a heating and cooling means and a pipe for supplying starting materials and having an internal capacity of 40 l, 13.7 kg of the above latex B-2, 3,66 kg of latex B-3, 0.48 g of ferrous sulfate, 38.4 g of glucose, 24 g of sodium pilophosphate and 620 g of deionized water were charged. The internal temperature of this reactor was raised to 60° C. While maintaining this temperature, 24 g of cumene hydroperoxide, 110 g of rosin soap, 220 g of 10% sodium hydroxide, 1.6 kg of deionized water, 3.36 kg of styrene, 1.44 kg of acrylonitrile and 48 g of t-dodecylmercaptan were continuously added to the reactor over a period of 2 hours and 45 minutes. During this period, the internal temperature of the reactor was raised from 60° C. to 70° C. over a period of 30 minutes. After reaching 70° C., the internal temperature was maintained at this level, and after the completion of the addition, the graft copolymerization reaction was continued for further 15 minutes. The pH of the obtained butadiene-styrene-acrylonitrile graft copolymer latex was 9.2, and the solid content was 39.1% by weight. This graft copolymer latex will be referred to as latex C-2.

Preparation of ABS Resin Crumbs

Into a coagulation tank equipped with a stirring means, a heating and cooling means and a pipe for supplying starting materials and having an internal capacity of 100 l, 60 kg of deionized water and 1.2 kg of magnesium sulfate were introduced, and while heating and stirring at a temperature of at least 90° C., 20 kg of the above-mentioned latex C-2 was charged. To this latex C-2, an antioxidant emulsion comprising 59 g of 4,4'-butylidene-bis(6-t-butyl-m-cresol), 59 g of tris(-monodinonylphenyl)phosphite, 22 g of polyoxyethylenenonylphenyl ether, 4 g of sodium dialkylsulfosuccinate and 151 g of deionized water was preliminarily mixed. In the coagulation tank, the graft polymer was coagulated as latex C-2 was charged.

Then, the slurry containing the coagulated product of the graft copolymer, was dehydrated by a centrifugal separator and then washed under a condition of pH 5.6 by means of an acidic solution containing 31 g of phosphoric acid in 60 kg of deionized water. After removing the washing solution, second washing was conducted by using 60 kg of deionized water again. The pH of the washing solution this time was 6.6. After removing the washing solution, dehydration was conducted by a centrifugal separator, and drying was conducted in the same manner as in Example 1 to obtain dried ABS resin crumbs.

With respect to the dried ABS resin crumbs, various evaluation tests were conducted in the same manner as in Example 1. The results are shown in Table 1.

EXAMPLE 4

Latex C-2 was subjected to coagulation treatment in the same manner as in Example 1 except that calcium chloride was used as the coagulating agent. The slurry containing the coagulated product of the graft copolymer was dehydrated and then washed under a condition of pH 5.7 by means of an acidic solution containing 31 g of phosphoric acid in 60 kg of deionized water. After removing the washing solution, second washing was conducted by using 60 kg of deionized water again. The pH this time was 6.7. After removing the washing solution, the same treatment as in Example 1 was conducted to obtain dried ABS resin crumbs.

With respect to the dried ABS resin crumbs, various evaluation tests were conducted in the same manner as in Example 1. The results are shown in Table 1.

COMPARATIVE EXAMPLE 3

Into a coagulation tank equipped with a stirring means, a heating and cooling means and a pipe for supplying starting materials and having an internal capacity of 100 l, 60 kg of deionized water and 1.2 kg of magnesium sulfate were introduced. While heating and stirring at a temperature of 90° C., 20 kg of latex C-2 was charged. To latex C-2, an antioxidant emulsion comprising 0.11 kg of 4,4'-butylidene-bis(6-t-butyl-m-cresol), 118 g of tris(monodinonylphenyl)phosphite, 44 g of polyoxyethylenenonylphenyl ether, 8 g of sodium dialkyl sulfosuccinate and 302 g of deionized water, was preliminarily mixed. In the coagulation tank, the graft copolymer was coagulated as latex C-2 was charged.

The slurry containing the coagulated product of the graft copolymer thus obtained, was dehydrated by a centrifugal separator, and then washed under a condition of pH 7.9 by means of 60 kg of deionized water. After removing the washing solution, second washing was conducted by using 60 kg of deionized water again. The pH this time was 8.1. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 1.

COMPARATIVE EXAMPLE 4

Preparation of Graft Copolymer Latex

Into a reactor equipped with a stirring means, a heating and cooling means and a pipe for supplying starting materials and having an internal capacity of 40 l, 13.7 kg of latex B-2, 3.66 kg of latex B-3 and 620 g of deionized water were charged. At a temperature of 80° C., 48 g of potassium persulfate, 800 g of deionized water, 3.36 kg of styrene, 1.44 kg of acrylonitrile, 48 g of t-dodecylmercaptan, 110 g of rosin soap, 120 g of 10% potassium hydroxide and 800 g of deionized water were continuously added over a period of 2 hours and 45 minutes. After completion of the addition, the graft copolymerization reaction was continued for further 30 minutes. The pH of the graft copolymer latex thus obtained was 9.1, and the solid content was 38.9% by weight. This latex will be referred to as latex C-3.

Preparation of ABS Resin Crumbs

To 20 kg of latex C-3, the same agents as used in Example 3 were added in the same amounts, and coagulation treatment of the latex was conducted in the same manner as in Example 3 to obtain a slurry containing the coagulated product of the graft copolymer. With respect to this slurry, dehydration, water washing treatment and drying treatment were conducted in the same manner as in Comparative Example 3 to obtain dried ABS resin crumbs.

With respect to the dried ABS resin crumbs thus obtained, various evaluation tests were conducted in the same manner as in Example 1. The results are shown in Table 1.

TABLE 1

|  | Examples | | | | Comparative Examples | | | |
|---|---|---|---|---|---|---|---|---|
|  | 1 | 2 | 3 | 4 | 1 | 2 | 3 | 4 |
| Graft copolymerization reaction | | | | | | | | |
| Polymerization initiator | Redox | Redox | Redox | Redox | Redox | Redox | Redox | Potassium persulfate |
| Graft copolymer | C-1 | C-1 | C-2 | C-2 | C-1 | C-1 | C-2 | C-3 |
| Coagulating step | | | | | | | | |
| Coagulating agent | Magnesium sulfate | Magnesium sulfate | Magnesium sulfate | Calcium chloride | Magnesium sulfate | Sulfuric acid | Magnesium sulfate | Magnesium sulfate |
| Water washing step | | | | | | | | |
| pH controlling agent for washing water | Sulfuric acid | Sulfuric acid | Phosphoric acid | Phosphoric acid | — | — | — | — |
| pH 1st washing | 6.1 | 4.5 | 5.6 | 5.7 | 7.9 | 7.9 | 7.9 | 7.9 |
| pH 2nd washing | 6.6 | 6.2 | 6.6 | 6.7 | 8.2 | 8.2 | 8.1 | 8.2 |
| Physical properties | | | | | | | | |
| Heat stability of crumbs (min.) | >120 | >120 | >120 | >120 | 20 | >120 | 30 | >120 |
| Tensile strength (kg/cm$^2$) | 485 | 488 | 471 | 466 | 479 | 491 | 476 | 469 |
| Izod impact strength (kgcm/cm) | 22.5 | 20.3 | 23.6 | 23.1 | 21.6 | 11.2 | 23.0 | 14.9 |
| Gloss | 94 | 94 | 95 | 94 | 93 | 93 | 94 | 92 |
| Heat disclooration during molding ΔE | 4.2 | 4.1 | 4.0 | 4.6 | 4.3 | 5.0 | 4.2 | 6.1 |

From the results of Table 1, the following is evident:

1) According to the process of the present invention, the heat stability of ABS resin crumbs during the drying is consistently excellent. Whereas, some of the products of the Comparative Examples have extremely low heat stability, and they are unstable. (See Examples 1 to 4 and Comparative Examples 1 and 3.)

2) Molded products of the ABS resin crumbs obtained by the process of the present invention are superior in the tensile strength and the Izod impact strength to molded products of the crumbs of Comparative Examples. Some of the products in the Comparative Examples are extremely poor in the Izod impact strength. (See Examples 1, 3 and 4 and Comparative Examples 2 and 4.)

3) With the ABS resin crumbs obtained by the process of the present invention, the heat discoloration at the time of molding is smaller than that in the Comparative Examples. (See Examples 1 to 4 and Comparative Examples 2 and 4.)

4) Further, the products obtained by the process of the present invention are superior in the balance of the physical properties for mold processability to those in the Comparative Examples. (See Examples 1 to 4 and Comparative Examples 1 to 4.)

EXAMPLE 5

Latex C-1 obtained C-1 in Example 1 was subjected to coagulation treatment in the same manner as in Example 1 to obtain a slurry containing a coagulated product of the graft copolymer. This slurry was dehydrated by a centrifugal separator and then washed under the condition of pH 6.1 by means of an acidic solution containing 16 g of sulfuric acid in 60 kg of deionized water. After removing the washing solution, second washing was conducted under the condition of pH 8.2 by means of a basic solution containing 8 g of potassium hydroxide in 60 kg of deionized water. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

EXAMPLE 6

Latex C-1 obtained in Example 1 was subjected to coagulation treatment in the same manner as in Example 1 to obtain a slurry containing the coagulated product of the graft copolymer. The slurry was dehydrated by a centrifugal separator and then washed under a condition of pH 4.5 by means of an acidic solution containing 26 g of sulfuric acid in 60 kg of deionized water. After removing the washing solution, second washing was conducted under the condition of pH 8.5 by means of a basic solution containing 12 g of sodium hydroxide in 60 kg of deionized water. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

COMPARATIVE EXAMPLE 5

Latex C-1 obtained in Example 1 was subjected to coagulation treatment in the same manner as in Example 1 to obtain a slurry containing the coagulated product of the graft copolymer. The slurry was dehydrated by a centrifugal separator and then washed under a condition of pH 7.9 by using 60 kg of deionized water. After removing the washing solution, second washing was conducted under the condition of pH 8.5 by means of a basic solution containing 2 g of potassium hydroxide in 60 kg of deionized water. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

COMPARATIVE EXAMPLE 6

By using latex C-1 obtained in Example, treatment was conducted in the same manner as in Example 1 except that 222 g of sulfuric acid was used instead of 1.2 kg of magnesium sulfate used as the coagulating agent in Example 1, whereby a slurry containing ABS resin crumbs was obtained. The above slurry was dehydrated by a centrifugal separator and then washed under the condition of pH 2.1 by using 60 kg of deionized water. After removing the washing solution, second washing was conducted under the condition of pH 3.5 by using 60 kg of deionized water again After removing the washing solution, dried ABS resin crumbs were obtained in the same manner as in Example 1. The results are shown in Table 2.

EXAMPLE 7

Latex C-2 obtained in Example 3 was subjected to coagulation treatment in the same manner as in Example 3 to obtain a slurry of the coagulated product of the graft copolymer. The slurry was dehydrated by a centrifugal separator and then washed under the condition of pH 5.6 by means of an acidic solution containing 31 g of phosphoric acid in 60 kg of deionized water After removing the washing solution, second washing was conducted under the condition of pH 8.7 by using a basic solution containing 6 g of potassium hydroxide in 60 kg of deionized water. After removing the washing solution, water was removed by a centrifugal separator, and drying was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

EXAMPLE 8

Latex C-2 was subjected to coagulation treatment in the same manner as in Example 1 except that calcium chloride was used as the coagulating agent. The slurry containing the coagulated product of the graft copolymer was dehydrated and then washed under a condition of pH 6.2 by means of an acidic solution containing 31 g of phosphoric acid in 60 kg of deionized water. After removing the washing solution, second washing was conducted under the condition-of pH 7.9 by using a basic solution containing 5 g of potassium hydroxide in 60 kg of deionized water. After removing the washing solution, the same treatment as in Example 1 was conducted to obtain dried ABS resin crumbs With respect to the dried ABS resin crumbs, various evaluation tests were conducted in the same manner as in Example 1. The results are shown in Table 2.

COMPARATIVE EXAMPLE 7

Into a coagulation tank equipped with a stirring means, a heating and cooling means and a pipe for supplying starting materials and having an internal capacity of 100 l, 60 kg of deionized water and 1.2 kg of magnesium sulfate were introduced. While heating and stirring at a temperature of 90° C., 20 kg of latex C-2 was charged. To latex C-2, an antioxidant emulsion comprising 0.11 kg of 4,4'-butylidene-bis(6-t-butyl-m-cresol), 118 g of tris(monodinonylphenyl)phosphite, 44 g of polyoxyethylenenonylphenyl ether, 8 g of sodium dialkyl sulfosuccinate and 302 g of deionized water, was preliminarily mixed. In the coagulation tank, the graft copolymer was coagulated as latex C-2 was charged.

The slurry containing the coagulated product of the graft copolymer thus obtained was dehydrated by a centrifugal separator, and then washed under a condition of pH 7.9 by means of 60 kg of deionized water. After removing the washing solution, second washing was conducted by using 60 kg of deionized water again. The pH this time was 8.1. After removing the washing solution, treatment was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

COMPARATIVE EXAMPLE 8

Latex C-2 was subjected to coagulation treatment in the same manner as in Example 3. The slurry containing the coagulated product of the graft copolymer thus obtained was dehydrated and then washed under the condition of pH 6.1 by means of an acidic solution containing 31 g of phosphoric acid in 60 kg of deionized water. After removing the washing solution, second washing was conducted by using 60 kg of deionized water again. The pH of the washing solution this time was 6.6. After removing the washing solution, water was removed by a centrifugal separator, and drying was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

COMPARATIVE EXAMPLE 9

Latex C-2 was subjected to coagulation treatment in the same manner as in Example 3. The slurry containing the coagulated product of the graft copolymer thus obtained was dehydrated and then washed under the condition of pH 9.1 by means of a basic solution containing 5 g of potassium hydroxide in 60 kg of deionized water. After removing the washing solution, second washing was conducted under the condition of pH 6.7 by means of an acidic solution containing 29 g of phosphoric acid in 60 kg of deionized water. After removing the washing solution, water was removed by a centrifugal separator, and drying was conducted in the same manner as in Example 1 to obtain dried ABS resin crumbs.

With respect to the dried ABS resin crumbs thus obtained, various evaluation tests were conducted in the same manner as in Example 1. The results are shown in Table 2.

COMPARATIVE EXAMPLE 10

Preparation of Graft Copolymer Latex

Into a reactor equipped with a stirring means, a heating and cooling means and a pipe for supplying starting materials and having an internal capacity of 40 l, 13.7 kg of latex B-2, 3.66 kg of latex B-3 and 620 g of deionized water were charged At a temperature of 80° C., 48 g of potassium persulfate, 800 g of deionized water, 3.36 kg of styrene, 1.44 kg of acrylonitrile, 48 g of t-dodecylmercaptan, 110 g of rosin soap, 120 g of 10% potassium hydroxide and 800 g of deionized water were continuously added over a period of 2 hours and 45 minutes. After completion of the addition, the graft copolymerization reaction was continued for further 30 minutes. The pH of the graft copolymer latex thus obtained was 9.1, and the solid content was 38.9% by weight. This latex will be referred to as latex C-3.

Preparation of ABS Resin Crumbs

To 20 kg of latex C-3, the same agents as used in Example 3 were added in the same amounts, and coagulation treatment of the latex was conducted in the same manner as in Example 3 to obtain a slurry containing the coagulated product of the graft copolymer. With respect to this slurry, dehydration, water washing treatment and drying treatment were conducted in the same manner as in Comparative Example 3 to obtain dried ABS resin crumbs.

With respect to the dried ABS resin crumbs thus obtained, various evaluation tests were conducted in the same manner as in Example 1. The results are shown in Table 2.

TABLE 2

| | Examples | | | | Comparative Examples | | | | | |
|---|---|---|---|---|---|---|---|---|---|---|
| | 5 | 6 | 7 | 8 | 5 | 6 | 7 | 8 | 9 | 10 |
| Graft copolymerization reaction | | | | | | | | | | |
| Polymerization initiator | Redox | Redox | Redox | Redox | Redox | Redox | Redox | Redox | Redox | Potassium persulfate |
| Graft copolymer | C-1 | C-1 | C-2 | C-2 | C-1 | C-1 | C-2 | C-2 | C-2 | C-3 |
| Coagulating step | | | | | | | | | | |
| Coagulating agent | Magnesium sulfate | Magnesium sulfate | Magnesium sulfate | Calcium chloride | Magnesium sulfate | Sulfuric acid | Magnesium sulfate | Magnesium sulfate | Magnesium sulfate | Magnesium sulfate |
| Water washing step | | | | | | | | | | |
| pH controlling agent for washing water 1 | Sulfuric acid | Sulfuric acid | Phosphoric acid | Phosphoric acid | — | — | — | Phosphoric acid | Potassium hydroxide | — |
| pH controlling agent for wash- | Potassium hydroxide | Sodium hydroxide | Potassium hydroxide | Potassium hydroxide | Potassium hydroxide | — | — | — | Phosphoric acid | — |

TABLE 2-continued

| | Examples | | | | Comparative Examples | | | | | |
|---|---|---|---|---|---|---|---|---|---|---|
| | 5 | 6 | 7 | 8 | 5 | 6 | 7 | 8 | 9 | 10 |
| ing water 2 | | | | | | | | | | |
| pH 1st washing | 6.1 | 4.5 | 5.6 | 6.2 | 7.9 | 2.1 | 7.9 | 6.1 | 9.1 | 8.2 |
| pH 2nd washing | 8.2 | 8.5 | 8.7 | 7.9 | 8.5 | 3.5 | 8.1 | 6.6 | 6.7 | 8.3 |
| Physical properties | | | | | | | | | | |
| Heat stability of crumbs (min.) | >120 | >120 | >120 | >120 | 20 | >120 | 30 | >120 | >120 | >120 |
| Residual organic acid (%) | 0.44 | 0.39 | 0.44 | 0.47 | 0.51 | 1.10 | 0.45 | 0.95 | 0.87 | 0.52 |
| Mold deposit | ○ | ○ | ○ | ○ | ○ | X | ○ | Δ | Δ | ○ |
| Tensile strength (kg/cm²) | 485 | 488 | 477 | 470 | 479 | 491 | 480 | 482 | 472 | 482 |
| Izod impact strength (kgcm/cm) | 22.5 | 21.1 | 23.6 | 23.4 | 21.6 | 11.2 | 23.1 | 23.5 | 22.6 | 14.4 |
| Gloss (%) | 94 | 94 | 95 | 94 | 94 | 93 | 93 | 94 | 95 | 92 |
| Heat discoloration during molding ΔE | 4.2 | 4.1 | 4.0 | 4.5 | 4.3 | 5.2 | 4.1 | 4.5 | 4.6 | 6.1 |

From the results of Table 2, the following is evident:

1) According to the process of the present invention, the heat stability of ABS resin crumbs during the drying operation is consistently excellent. Whereas, some of the products in the Comparative Examples have very poor heat stability, and they are unstable. (See Examples 5 to 8 and Comparative Examples 5 and 7.)

2) The amount of residual organic acid in the ABS resin crumbs obtained according to the process of the present invention is small as compared with that in the crumbs of Comparative Examples, and the amount of the deposit on the mold during the molding is small. (See Examples 5 to 8 and Comparative Examples 6, 8 and 9.)

3) Molded products of the ABS resin crumbs obtained by the method of the present invention are superior in the tensile strength and Izod impact strength to molded products of crumbs in the Comparative Examples. Some of the products in the Comparative Examples are very poor particularly in the Izod impact strength. (See Examples 5, 7 and 8 and Comparative Examples 6 and 10.)

4) With ABS resin crumbs obtained by the method of the present invention, the heat discoloration at the time of molding them into shaped products, is less than Comparative Examples. (See Examples 5 to 8 and Comparative Examples 6 and 10.)

5) Further, the products obtained by the method of the present invention are superior in the balance of the physical properties for mold processability to the products of Comparative Examples. (See Examples 5 to 8 and Comparative Examples 5 to 10.)

We claim:

1. A process for preparing an impact resistant resin, which comprises:

a step of graft copolymerizing a monomer mixture comprising an aromatic vinyl monomer and a monomer copolymerizable therewith, to a butadiene rubber polymeric latex in the presence of a redox polymerization initiator to form a graft copolymer latex;

a step of coagulating the resulting graft copolymer latex by mixing an antioxidant thereto and adding an alkaline earth metal salt thereto to form an aqueous slurry containing a coagulated product of the graft copolymer;

a step of removing water from said aqueous slurry to obtain the coagulated product;

a step of washing the coagulated product by a first washing water having the pH adjusted to a level of at most 7;

a step of removing the first washing water from the coagulated product to form a washed coagulated product;

a step of further washing the washed coagulated product with a second washing water having the pH adjusted to a level of at least 7.5; and a step of removing the second washing water from the washed coagulated product to form a further washed coagulated product.

2. The process according to claim 1, wherein the weight ratio of the butadiene rubber polymeric latex to the monomer mixture to be graft copolymerized, is selected so that the butadiene rubber polymer in the coagulated product will be within a range of from 30 to 60% by weight.

3. The process according to claim 1, wherein the redox polymerization initiator is a combination of an organic peroxide and an iron salt.

4. The process according to claim 3, wherein the organic peroxide is cumene hydroperoxide, t-butyl hydroperoxide, diisopropylbenzene hydroperoxide or p-methane hydroperoxide.

5. The process according to claim 3, wherein the iron salt is ferrous sulfate.

6. The process according to claim 3, wherein the redox polymerization initiator is used in combination with a saccharide, sodium-formaldehyde-sulfoxylate or ethylenediaminetetraacetic acid.

7. The process according to claim 1, wherein the butadiene rubber polymeric latex is a polybutadiene latex or a copolymer of butadiene with a comonomer selected from the group consisting of an aromatic vinyl monomer, a vinyl cyanide compound, an alkyl acrylate and an alkyl methacrylate, said copolymer containing at least 50% by weight of butadiene.

8. The process according to claim 1, wherein the aromatic vinyl monomer is styrene, $\alpha$-methylstyrene, p-methylstyrene, chlorostyrene or vinyl toluene.

9. The process according to claim 1, wherein the monomer copolymerizable with the aromatic vinyl monomer is a vinyl cyanide compound, acrylic acid, methacrylic acid or an alkyl acrylate or methacrylate.

* * * * *